Jan. 11, 1966  C. C. RAYBURN  3,229,200
RESISTOR TEST PROBE
Filed Nov. 17, 1961
Fig.1
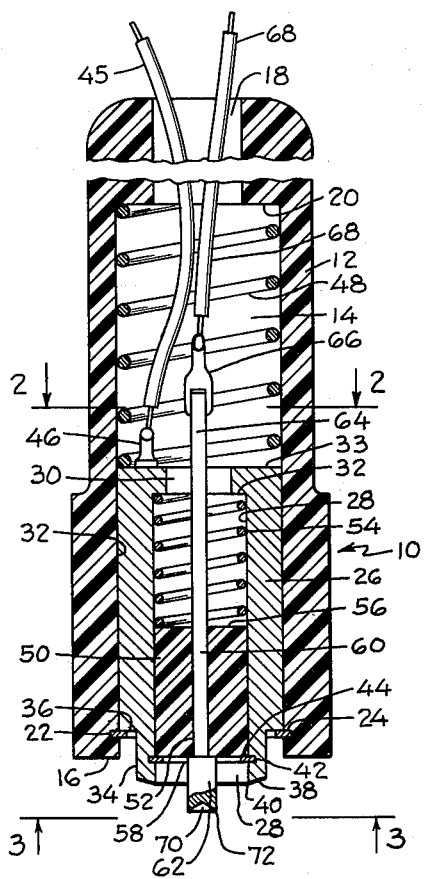
Fig.2
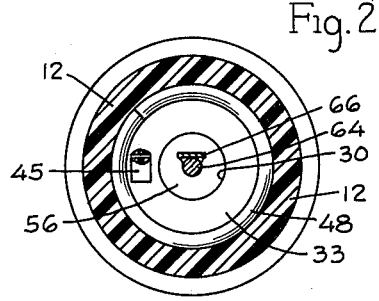
Fig.4
Fig.3
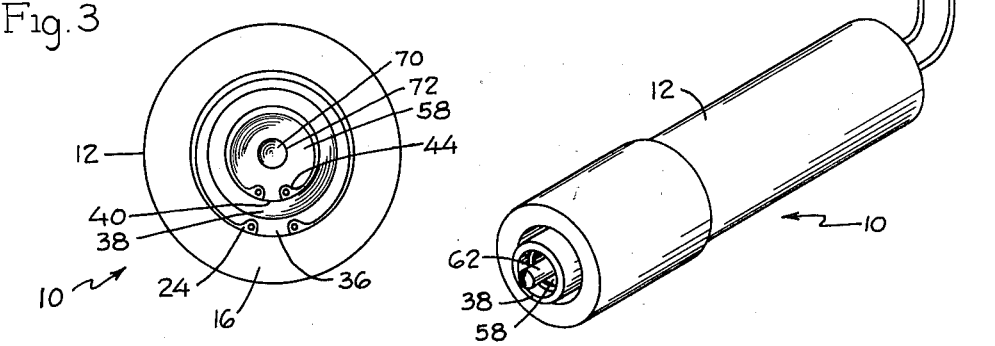
INVENTOR.
Charles C. Rayburn
BY
ATTY.

United States Patent Office 3,229,200
Patented Jan. 11, 1966

3,229,200
RESISTOR TEST PROBE
Charles C. Rayburn, Falls Church, Va., assignor to Illinois Tool Works Inc., Chicago, Ill., a corporation of Delaware
Filed Nov. 17, 1961, Ser. No. 152,991
2 Claims. (Cl. 324—62)

This invention relates in general to a resistor test probe and more particularly relates to a portable resistor test probe especially adapted for testing thin film type resistors.

In the manufacturing operation of film type of resistors, it is particularly desirable to have a portable resistor test probe which will accurately measure the resistance of the particular resistor. Some resistors, for example, carbon tape resistors, are relatively soft and thus care must be taken in the testing of the resistor so that it will not cut the resistor apart or otherwise permanently damage same. This invention is directed to a resistor test probe which is particularly well adapted for testing the electrical characteristics of a film type of resistor without damaging same.

It is an object of this invention to provide a portable test probe for resistors which is easy to use, will not damage material tested, is easy to assemble, is electrically safe, and will provide an accurate measurement of electrical resistance.

The novel features that are characteristic of this invention are set forth with particularity in the appended claims. The invention itself, however, both as to its organization and its method of operation, together with additional objects and advantages thereof will best be understood by the following description of specific embodiments when read in connection with the accompanying drawings in which:

FIG. 1 is a sectional view along the axis of the probe;

FIG. 2 is a sectional view taken along lines 2—2 of FIG. 1;

FIG. 3 is an end view along lines 3—3 of FIG. 1; and

FIG. 4 is an isometric perspective view of the test probe, the measuring instrument attached thereto being shown in a semidiagrammatic manner.

The probe 10 essentially comprises an elongated handle means 12 which is preferably made of insulating material and also serves as the housing for the probe. One end of the housing 12 is formed with a large bore 14 which forms a cavity for receipt of the working parts of the probe as shall be explained. A second smaller bore 18 traverses the upper part of the handle as shown in FIG. 1 and the internal juncture of the two bores forms a shoulder 20 which is spaced a predetermined distance above the end surface 16 of the housing. A circular groove 22 is formed in the cavity 14 walls adjacent the end 16 for receipt of suitable retaining means 24 which forms a shoulder means. For example, a C-ring 24 or the like is disposed in groove 22 to retain the working parts of the probe within the cavity 14.

A first annular contact means 26 is movably disposed within the cavity 14, said first contact means being preferredly formed of a metal such as, for example, brass. The first contact means 26 is formed with a large central bore 28 and a smaller concentric bore 30, the juncture therebetween forming an internal shoulder 32 as shown in FIG. 1. The contact means 26 has an outer diameter surface 32 which is adapted to ride within the bore 14 of the housing means. The lower end of the contact means 26 (as viewed in FIG. 1) is formed with a radially inward offset portion 34 which defines a shoulder 36 which engages the retaining means 24 to limit outward movement thereof as shown. The terminal surface of the contact means 26 is beveled (disposed at an acute angle to the axis) at 38 to define a sharp edge 40 at the junction of surface 38 and the bore 28. A groove 42 is formed in the bore 28 to receive a second shoulder retaining means 44 also in the form of a suitable C-clamp or the like for purposes hereinafter appearing. On the other end 33 of the contact means 28 is a soldering tab 46 which is attached to an electrical lead member 45 which leads to a measuring apparatus 74 as shown in FIG. 4. A first coil spring means 48 biases the shoulder 36 of the first contact means 28 into engagement with the retaining means 24 and is interposed between end surface 33 of the contact means and internal shoulder 20 of the housing means as shown in FIG. 1.

An insert 50 of relatively high lubricity type insulating material is formed into a cylindrical shape and is disposed within the bore 28 of the first contact means 26 for relative movement thereto. The insulating member 50 may be formed of polytetrafluoroethylene or a material with similar properties, one such material being commercially available and sold under the registered trademark "Teflon." The insulating member 50 has a central bore 52 which surrounds and is fixed to a second contact means 60 by any suitable means as, for example, bonding thereto. A second coil spring 54 engages the top end 56 of insulating member 50 so that the bottom end 58 is disposed in engagement with the second retaining member 44. The second spring 54 is of light force and has a predetermined force less than the force of spring 48.

The second contact means 60 has a head portion 62 which is larger than the shank portion 64. The other end of the shank portion 64 is formed with a terminal tab 66 for soldering to a suitable lead wire 68 which also extends through the bore 18 in the handle means for attachment to the other terminal of the measuring device 74. The head portion 62 of the second contact means is formed with a conical recess 70 to define a sharp edge 72 for making good electrical contact with the member to be tested.

It will be noted that the edge surface 72 of the second contact means extends beyond the edge 40 of the first contact means and both of these edges extend beyond the end surface 16 of the housing means 12. In operation, due to the above-described geometry, it is relatively easy for an operator to visually perceive and locate the point on the workpiece at which he desires to place the head portion 62 of the first or inner contact means. The operator places the central contact means 60 on the resistor to be tested and the entire handle of the probe means is advanced against the pressure of the two springs 48 and 54. However, damage is prevented to the resistor being tested due to the fact that the amount of pressure can be controlled by controlling the spring rates of the two springs. By using relatively light springs 54 and 48 the end surface 16 will bottom on the resistor and thus only a predetermined and controlled amount of force will be applied on the relatively sharp edges 72 and 40 of the two contact means, the amount being sufficient for good electrical contact but insufficient to damage the workpiece.

Although a specific embodiment has been shown and described, it is with full awareness that many modifications thereof are possible. The invention, therefore, is not to be restricted except insofar as is necessitated by the prior art and by the spirit of the appended claims.

What is claimed as the invention is:

1. A portable hand operated resistor sheet test probe comprising a handle housing means of insulating material having wall means defining a central cylindrical cavity open on at least one end, first shoulder stop means on said wall means adjacent the said one end of the cavity, first movable annular contact means concentrically disposed within said cavity and having a first portion extending axially beyond the end surfaces of the walls thereof, and a second portion disposed in retaining engagement with said shoulder stop means, second shoulder stop means on said first contact means, first biasing means biasing said first contact means second portion against said first shoulder stop means with a first predetermined force, second movable contact means mounted concentrically within said first annular contact means for movement both therewith and relative thereto, the end portion of said second contact means extending axially beyond said first contact means, insulating means concentrically disposed intermediate said first and second contact means and in engagement with said second shoulder means and fixed to said second contact means for movement therewith, second biasing means coaxial with said first biasing means and engaging said first contact means and said insulating means and thereby biasing said second contact means in the same direction as said first contact means, said second biasing means opposing said first biasing means by a predetermined force less than the predetermined force of said first biasing means, both of said first and second contact means terminal ends being formed with a circular sharp edge located outside of said handle housing means to provide good electrical contact with a workpiece to be tested, and electrical lead means associated with each of said first and second contact means.

2. The test probe set forth in claim 1 wherein the first and second biasing means are in the form of coil springs.

References Cited by the Examiner

UNITED STATES PATENTS

| 1,560,278 | 11/1925 | Mahan | 324—53 |
| 1,610,553 | 12/1926 | McIlvaine | 324—65 |
| 2,811,691 | 10/1957 | Dahm et al. | 324—65 |

FOREIGN PATENTS 821,676  11/1951  Germany.

WALTER L. CARLSON, *Primary Examiner.*

J. P. O'BRIEN, W. H. BUCKLER, *Assistant Examiners.*